July 8, 1969  J. H. BOSTOCK  3,454,085
WELL INSTALLATION WITH PLURAL FLOW METERS
Filed Nov. 30, 1966

INVENTOR
James H. Bostock
BY Hastings Ackley and Walter J. Jagmin
ATTORNEYS

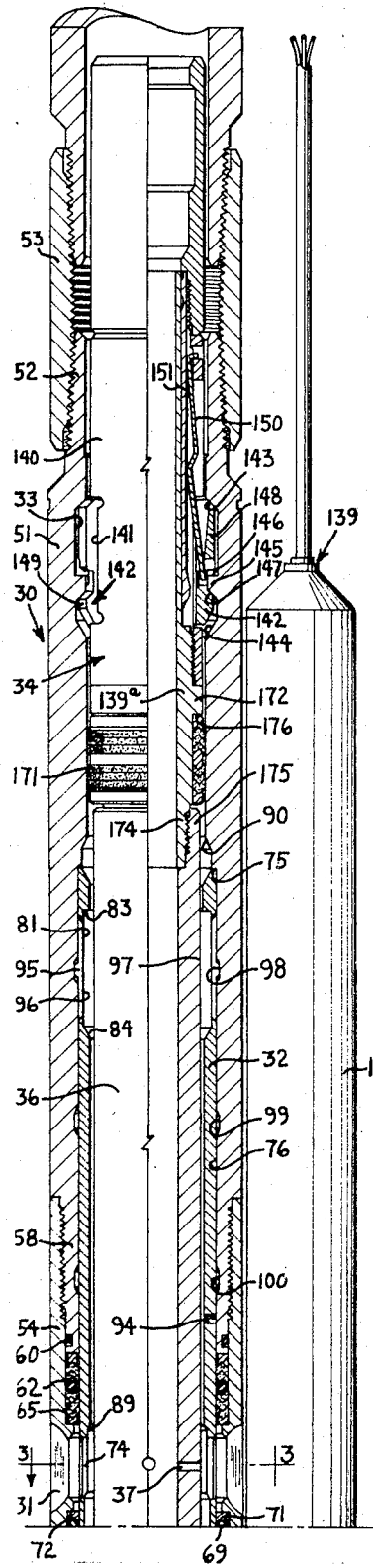

United States Patent Office 3,454,085
Patented July 8, 1969

3,454,085
WELL INSTALLATION WITH PLURAL
FLOW METERS
James H. Bostock, Dallas, Tex., assignor to Otis Engineering Corporation, Dallas, Tex., a corporation of Delaware
Filed Nov. 30, 1966, Ser. No. 597,950
Int. Cl. E21b 43/14, 47/12; G01f 1/00
U.S. Cl. 166—66         12 Claims

ABSTRACT OF THE DISCLOSURE

A well installation providing fluid flow communication between the earth surface and one or more earth formations penetrated by a well bore by means of a flow conductor which extends through the well bore. The flow conductor has vertically spaced ports between barrier means which close the well bore about the flow conductor between each pair of such earth formations. The ports provide communication between the flow conductor and the earth formations. Flow meters mounted on the flow conductor are used to determine the rate of flow of fluid in the flow conductor above or below each port so that the rate of flow of fluids between each such earth formation and the flow conductor can be determined.

---

This invention relates to well installations and well tools usable in such well installations and more particularly to well installations and tools usable therein for providing fluid flow communication between the surface and one or more earth formations penetrated by a well bore.

An object of this invention is to provide a new and improved well installation for providing communication between the earth surface and a plurality of earth formations penetrated by a well bore, the well installation having means for measuring the rate of flow of fluids between each earth formation and the flow conductor.

Another object is to provide a well installation for injecting liquids into one or more earth formations penetrated by a well bore or to produce well fluids simultaneously from the earth formations, the well installation having means for determining the rates of injection of liquid from the flow conductor into each of the earth formations or the rate of flow of well fluid from each formation into the flow conductor.

Still another object is to provide a well installation of the type described wherein the flow conductor has longitudinally spaced lateral ports through which fluid communication can be established with each of the earth formations and valve means for closing the ports to prevent fluid flow between the flow conductor and selected earth formations and at least one flow control assembly removably positionable in the flow conductor for controlling the rate of flow between an earth formation and the flow conductor and for measuring the rate of flow of fluids in the flow conductor.

A further object is to provide a well installation of the type described wherein the flow meter means includes a detector means mounted on the flow conductor and a rotor carried by the control assembly whose rotation varies in accordance with the rate of flow of fluids through the flow conductor the detector means providing electric signals which vary in accordance with the speed of rotation of the rotor.

A still further object is to provide a well installation wherein each flow control assembly has ports of predetermined effective orifice which control the rate of flow of fluids between an earth formation and the flow conductor.

Another object is to provide a well installation wherein the flow conductor adjacent each of its ports has anchoring means cooperable with an anchoring and locating device of a flow control assembly for locating and anchoring the flow control assembly in a predetermined position in the flow conductor.

Still another object is to provide a well installation having a flow conductor extending through a well bore and having packers for closing the well bore between adjacent earth formations into which fluid is to be injected or from which fluids are to be produced, the flow conductor having landing nipples connected therein and constituting sections thereof, each landing nipple having a lateral port, a sleeve valve slidable in an internal recess of the landing nipple for closing the port and having locating and anchoring grooves, the well installation also having a flow control assembly which includes a tubular body having lateral ports and anchoring and locating means selectively movable into the locating and anchoring grooves of the landing nipple for positioning and anchoring the flow control assembly in the flow conductor in a position wherein the ports of the tubular body are in position to communicate with the ports of the landing nipple.

Still another object is to provide a well installation wherein the flow control assembly has a rotor mounted in the tubular body which cooperates with a detector means mounted on the landing nipple to provide electric signals whose frequency varies in accordance with the rate of flow of fluids past the rotor.

Another object is to provide a well installation wherein the tubular body of the flow conductor assembly and the landing nipple have cooperable seal means for sealing therebetween above and below the ports whereby the rate of fluid flow between an earth formation and the interior of the flow conductor is determined by the effective orifice of the port of the tubular body which is smaller than the orifice of the landing nipple port.

A main object of the invention is to provide a new and improved flow control assembly which is removably positionable in a flow conductor for controlling the rate of flow through a lateral port of the flow conductor and to measure the rate of flow of fluids through the flow conductor at a predetermined location relative to such lateral port.

Another object is to provide a flow control assembly having a tubular body and anchoring means for anchoring the tubular body in predetermined position in a flow conductor, the body having ports of predetermined orifice for controlling the flow of fluids between the flow conductor and the exterior thereof through a lateral port of the flow conductor.

Still another object is to provide a flow control assembly wherein the tubular body has a rotor mounted therein in predetermined relation to its ports whose speed of rotation varies in accordance with the flow of fluids therepast.

The invention is therefore directed to a well installation for a well traversing a plurality of earth formations, wherein a flow conductor is disposed in the well bore having barrier means or packers sealing off between the flow conductor and the well bore between adjacent earth formations, and having openable and closable lateral port means provided in the conductor communicating with each of the earth formations, and a plurality of flow meter means carried by the flow conductor, adapted to measure the rate of flow of fluids through each lateral port in either direction between the adjacent earth formation and the interior of the flow conductor. The lateral ports are selectively openable and closable and the flow means may be positioned at any of said lateral ports.

Additional objects and advantages of the invention will be readily apparent from the reading of the following description of a device constructed in accordance with the invention, and reference to the accompanying drawings thereof, wherein:

FIGURES 2 and 2A are a vertical partly sectional view of a landing nipple and a control assembly anchored therein of the well installation embodying the invention;

FIGURE 6 is a vertical sectional view of a packer usable in the well installation; and FIGURE 7 is a sectional view taken on line 7—7 of FIGURE 6.

Figure 1:
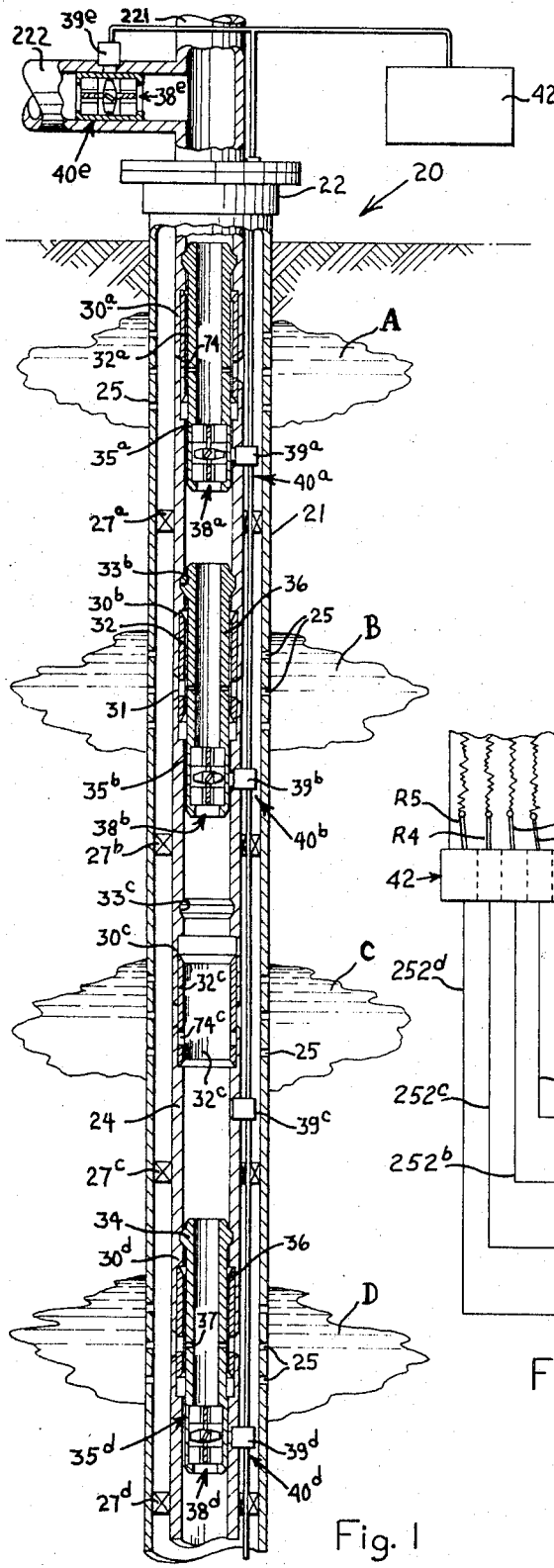
FIGURE 1 is a schematic partly sectional view of a well installation embodying the invention.
Figure 3:
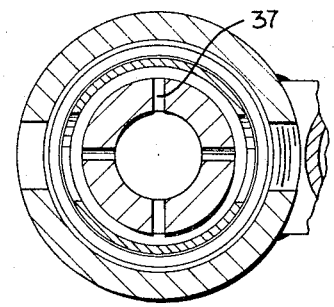
FIGURE 3 is a sectional view taken on line 3—3 of FIGURE 2.

Referring now to the drawings, the well installation 20 embodying the invention includes the usual well casing 21 which is closed at its upper end by the usual casing head 22 through which extends the upper end of the usual flow conductor 24, such as a string of tubing. The well penetrates several earth formations or zones A, B, C, and D, into one or more of which, for example, into the formations A, B and D, water is to be injected to stimulate the production of well fluids from these formations by one or more other wells which also penetrate the same formations. The casing is provided with perforations 25 at the locations of the formations and the casing is cemented in the well bore to prevent flow of the injected water exterior of the casing upwardly or downwardly of the formations. Suitable packers 27a, 27b, 27c and 27d mounted on the flow conductor seal between the flow conductor and the well casing between the earth formations. The flow conductor at the location of each earth formation into which the water is to be injected is provided with a section or landing nipple 30, such as the landing nipples 30a, 30b, 30c and 30d, having lateral ports 31, sleeve valves 32 for selectively closing or opening the ports, and latch means or locating and anchoring grooves 33 which are cooperable with the locating and anchoring device 34 of a removable flow control assembly 35. The flow control assembly includes an orifice mandrel 36 having ports 37 of predetermined combined orifice to control the rate of flow of the water therethrough from the flow conductor into the casing, and a rotor assembly 38. The rotor assembly cooperates with a pick-up assembly 39 mounted on the landing nipple to provide electric signals whose frequency varies in accordance with the velocity of flow of water through the rotor assembly. Each rotor assembly and the associated pickup assembly constitute a flow meter 40 which measures the velocity of flow of water through the rotor assembly. The electric signals are transmitted through conductors of a suitable cable to a suitable read out equipment 42 at the surface which translates the electrical signals to indications, as by a meter or recording instrument, of the rate of flow of water through the rotor assembly. A similar flow meter 40e is provided at the surface to determine the velocity of flow of the water into the upper end of the flow conductor.

Since the effective orifice of each rotor assembly is of known fixed value, and the velocity of flow of water therethrough is measured by the flow meter, the flow of water per unit of time into each of the earth formations may be easily determined. For example, if the flow meter 40e indicates that 400 barrels of water per day are flowing into the upper end of the flow conductor and the flow meter 40a indicates that 350 barrels per day are flowing past its location, it is easily seen that 50 barrels of water per day (400—350) are flowing into the earth formation A. Similarly, the rate of flow of water into each of the other formations can be similarly determined.

For example, if the flow meter 40b indicates that 250 barrels of water per day are flowing through the flow conductor at its location, it is obvious that 100 barrels of water a day (350—250) are flowing into the earth formation B.

It will also be apparent that the rate of flow into each formation is determined by the effective orifice of the ports 37 of the orifice mandrel 36, so that the rate of flow of water into any formation can be varied as desired by removing the flow control assembly 35 which controls the flow into such formation and replacing it with another whose orifice mandrel ports 37 have the required total effective orifice.

If it is desired that no water should be injected into a particular formation, e.g., the formation C, the sleeve valve 32c of the nipple 30c may be moved by an appropriate shifting tool to its closed position and no flow control assembly will then be positioned in such nipple since there is no lateral flow.

The sleeve valves 32 may have the structure and the mode of operation of the sleeve valve illustrated and described in the patent to Grimmer et al., No. 3,051,243, issued Aug. 28, 1962, and are movable between their upper open positions and their lower closed positions by the shifting tool of the type illustrated and described in this patent.

Each landing nipple 30 includes a top section 51 having an upper reduced threaded end portion 52 by means of which the upper end of the nipple may be connected by the usual coupling collar 53 to the bottom end of the next upper section of the flow conductor, a middle seal section 54 and a bottom section 55. The bottom section has a reduced threaded end portion 56 which is connectable to the upper end of the next lower section of the flow conductor by a coupling collar, in the usual manner as shown. The top and bottom nipple sections have reduced lower and upper end portions 58 and 59, respectively, which are threaded into opposite ends of the middle section 54. O-rings 60 and 61 disposed in external annular recesses of the top and bottom nipple sections, respectively, seal between the top and bottom sections and the middle section above an upper seal assembly 62 and below a lower seal assembly 63 mounted on the middle nipple section. The seal assemblies 162 and 163 are mounted above and below, respectively, the ports 31 of the nipple which are provided in its middle section. The upper seal assembly is held between the upwardly facing annular internal shoulder 65 of the middle section and the annular bottom end surface of the top nipple section. The lower seal assembly 63 is held between a split retainer ring 67, whose outer portions are received in an internal annular recess 68 of the middle nipple section, and the top annular end surface of the bottom nipple section. A pressure equalizing seal assembly 69 includes an O-ring 70 mounted in the middle nipple section above the lower seal, and two adapters 71. The equalizing seal assembly is disposed below a downwardly facing annular shoulder 72 of the middle nipple section and the top surface of the retainer ring 67.

The seal assemblies 62 and 63 seal above and below a plurality of circumferentially spaced lateral ports 74 of the sleeve valve when the sleeve valve is in its top open position in the landing nipple wherein the sleeve valve ports are in communication with the nipple ports 31. When the sleeve is in its top open position, its upward movement is limited by the engagement of its annular top end surface with a downwardly facing annular shoulder 75 of the top nipple section which defines the upper end of the internal annular recess 76 of the landing nipple in which the sleeve valve is slidably disposed. An upwardly facing annular shoulder 77 of the bottom nipple section defines the lower end of the recess 76 and limits downward movement of the sleeve valve therein.

The sleeve valve has internal top and bottom annular key recesses 81 and 82. The upper end of the top key recess is defined by an abrupt downwardly facing shoulder 83 which is engageable by suitable expandable key means of a shifting tool for moving the sleeve valve from its bottom closed position to its upper open position, and its bottom end is defined by the downwardly and inwardly sloping cam shoulder 84 which permits the retractable key means of the shifting tool to be cammed inwardly to permit downward movement of such shifting tool therethrough. The bottom key recess is similarly defined by an upwardly facing abrupt shoulder 87 which is engageable by the expandable key means of a shifting tool for moving the sleeve downwardly to its closed position wherein its further downward movement is arrested by the upwardly facing annular shoulder 77. The sleeve valve above the abrupt shoulder 87 has an upwardly sloping cam shoulder 89 for camming the key means of the shifting tool inwardly to permit upward movement of the shifting tool through the sleeve valve.

The top nipple section has an upwardly and inwardly inclined release cam shoulder 90 above the recess 76 which moves the shifting tool key means to their retracted position to disengage them from the upper shoulder 83 of the sleeve valve when the sleeve valve has been moved to its top open position to permit continued upward movement of the shifting tool through the sleeve valve.

The nipple also has a lower release cam shoulder 92 below the shoulder 77 for similarly causing the disengagement of the shifting tool key means with the sleeve valve shoulder 87 to permit further downward movement of the shifting tool when the sleeve valve has been moved to its lower closed position.

The sleeve is releasably held in its top open position, in an intermediate pressure equalizing position wherein its equalizing ports 94 of restricted orifice are in communication with the nipple ports 31, and in its bottom closed position by the external bosses 95 of resilient collet strips 96 formed by slots 97 at the location of the top key recess which are receivable in the internal detent recesses 98, 99 and 100, respectively.

The landing nipple, the sleeve valve and the shifting tool for moving the sleeve valve between its open and closed positions, being fully described in the patent to Grimmer et al., 3,051,243, will not be described in greater detail herein.

An external lug 105 is welded to the bottom nipple section below the lower cam shoulder 92 and has a passage 106 threaded at its outer end portion for receiving a closure plug 107. The pick-up assembly 39 is mounted in the lug passage 106 and includes a rod shaped magnet 107 whose inner end portion extends into an annular cap 110 of a non-magnetic substance. The cap has a reduced inner end portion 112 which extends into an aperture of the bottom nipple section and whose inner arcuate surface 113 lies in the same cylindrical plane as the internal surface of the bottom nipple section. The cap also extends into the enlarged inner portion 114 of the lug passage 106. The magnet extends through a bobbin 118 on which is wound a coil 119 of electrically conductive wire. The end or nose of the magnet extends into an external recess 121 of the cap so that it is positioned a very short distance from the internal surface 113 of the cap. The pick-up assembly as held against outward movement in the lug passage by a split retainer ring 125 whose outer portions are received in an internal annular recess of the lug and a spacer disc 128 disposed between the outer end of the pick-up assembly and the retainer ring.

A perpendicular upper bore 130 intersects the transverse passage 106 so that the conductors 131 connected to opposite ends of the coil 118 may extend into an amplifier housing 133 mounted on an upper threaded extension of the lug by a suitable nut 135. A cable 137, having conductors for transmitting electric current to an amplifier 138 which amplifies the output of the coil 118 and conductors for transmitting the output of the amplifier to the surface, extends through the housing and the bore 130 of the lug. Suitable fitting and gasket assemblies 139 are provided which seal between the cable and the lug and the amplifier housing at the locations of entry of the cable into the lug below the passage 106 and into the housing at its top end. The cable also extends through a suitable sealed passage of the casing head and of the packers 27.

The locating and anchoring assembly 34 may be of the type illustrated and described in the United States patent to Tamplen, No. 3,208,531, issued Sept. 28, 1965, and includes a mandrel 139a on which is mounted a dog carrying sleeve 140 having a pair of opposed windows 141 on which a pair of locking dogs 142 are movable.

The top nipple section above the release cam shoulder 90 has the internal locking groove 33 defined by a downwardly and outwardly inclined shoulder 143 at its upper end and by an upwardly and outwardly inclined shoulder 144 at its lower end. Intermediate the ends of the locking groove is an internal annular locking and seating flange 145 having an upper abrupt upwardly facing annular stop shoulder 146 substantially normal to the longitudinal axis of the nipple and a lower downwardly and outwardly extending locking shoulder 147. The dogs have upper bosses 148 receivable in the locking groove above the flange 145 and lower bosses 149 receivable in the lower portion of the groove below the flange. The locating and anchoring device also includes a spring 150 for moving each dog outwardly and a locking sleeve 151 for locking the dogs in their expanded positions after they have been released for outward movement and have moved outwardly into a locking groove of a nipple 30. The locking dogs are initially held in their retracted position and the locking sleeve is held in an upper position relative to the dogs by a suitable running tool during the insertion of the flow control assembly into a landing nipple and are movable to their retracted positions by a pulling tool when it is desired to remove the flow control assembly from the landing nipple by a suitable pulling tool. Such running and pulling tools and the mode of operation of the locating and anchoring device 34 will not be described in greater detail herein, being fully described in the patent to Tamplen, No. 3,208,531.

The locating and anchoring device also includes a seal assembly 171 mounted on the mandrel 139a below its external flange 172 for sealing between the landing nipple and the mandrel below the locking recess 33 and above the nipple recess 76 when the locating and anchoring device is locked in the landing nipple.

The orifice mandrel 36 is secured to the lower end of the mandrel 139a of the locating and anchoring device, the lower reduced end portion 174 of the orifice mandrel being threaded in the upper end portion 175 of the orifice mandrel. Movement of the seal assembly 171 on the mandrel 156 is limited by the downwardly facing annular shoulder 176 of the mandrel 139a and the annular top end surface of the orifice mandrel. The ports 37 of the orifice mandrel have a predetermined combined effective orifice and communicate with the interior of the sleeve valve between the seal assembly 171 and a lower seal assembly 178 mounted on a seal mandrel 179 which seals between the seal mandrel and the nipple below the lateral ports in said nipple. The lower end portion 180 of the orifice mandrel is threaded in the upper end portion of the seal mandrel.

The rotor assembly 38 includes a tubular housing 181 having a top section 182 threaded on the reduced end portion 183 of the seal mandrel. The annular top end surface of the top section limits downward movement of the seal assembly 178 on the seal mandrel. The rotor housing includes a tubular middle section 184 of non-magnetic substance and a bottom retainer ring 185. The housing sections are rigidly secured to one another in any suitable manner, as by silver solder. Upper and lower retainer rings 187 and 188 spaced from the top and bottom sections respectively, are similarly secured in the middle housing section. An upper spider 190 is rigidly secured between the top housing section 182 and the ring 187, the top end surfaces of its four radial arms 193 bearing against the bottom end surface 195 of the top housing section whose lower end portion 196 is telescoped in the upper end portion of the middle housing section. The spider arms are provided with downwardly opening end recesses 197 in which the retainer ring 187 is received.

The spider has a central portion 198 which extends downwardly of the retainer ring 187 and is provided with a downwardly opening bore 199. The upper end of the shaft 200 of a rotor 201 is disposed in the bore. A bearing ball 202 is positioned between the top end of the rotor shaft and the surface of the central spider portion defining the inner end of its bore 198.

The lower end of the rotor shaft is similarly received in an upwardly opening bore 205 of the central portion 206 of a spider 208. A bearing ball 207 also is in the bore 205 to reduce friction between the rotor and the spider. The spider 208 has radial arms 210 provided with upwardly opening recesses 212 in which the upper retainer ring 188 is receivable. Downward movement of the spider 208 is limited by the engagement of the bottom end surfaces of the arms 210 with the top annular end surface of the reduced portion 213 of the bottom housing section which is telescoped in the bottom end of the middle housing section.

Figure 4:
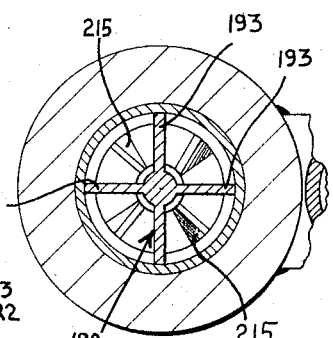
FIGURE 4 is a sectional view taken on line 4—4 of FIGURE 2A.

The rotor 201 has a plurality of arms 215 which extend radially outwardly from its shaft and which are curved so that water flowing downwardly through the rotor housing impinging on the surfaces of the vanes will tend to move to rotate the vanes in a counterclockwise direction, FIGURE 4. The rotor is formed of a magnetic substance so that the blades or vanes 215 which are aligned with the nose of the magnet 107 of the pick-up will cause the reluctance of the flux path of the magnet to vary each time one of the vanes moves past the magnet and a signal voltage or pulse will be induced in the coil 118. The frequency of the signal pulses varies in accordance with the speed of rotation of the rotor.

The packers 27 may be of any suitable type, for example of the type illustrated in FIGURES 6 and 7, each of which has a mandrel 300 connected between and to adjacent sections of the flow conductor by couplings 301 and 302, the mandrel constituting a section of the flow conductor. A pair of oppositely facing resilient cups 303 and 304 molded or bonded to retainer rings 305 and 306, respectively, are held apart by a spacer ring 307. A pair of retainer sleeves 308 and 309 hold the cups against movement in opposite directions toward the couplings. The retainer rings each have an O-ring 310 which seals between the ring and the packer mandrel.

The apertures of the rings through which the mandrel extends are offset from the central axis of the rings to provide room for the mounting on the packer of electric connector assemblies 311. Each of the connector assemblies includes a tube 312 which extends through aligned apertures in the retainer and spacer ring, O-rings 313 disposed in recesses of the retainer rings sealing between the tube and the retainer rings. An upper connector 314 has a tubular body 315 threaded in the upper end portion of the tube and an O-ring 316 seals between the connector body and the tube. The connector also has a flange 317 which limits inward movement of the connector body in the upper end of the tube. The connector includes a conductor 318 whch extends through the body and insulated therefrom by an insulator sleeve 319. A lower connector 314a threaded in the lower end of the tube is identical in structure to the connector 314 and accordingly its elements have been provided with the same reference numerals, to which the subscript "a" has been added, as the corresponding elements of the connector 314. The inner ends of the two conductors 318 and 318a are received in oppositely opening bores of an electrically conductive sleeve 320 which may be insulated from the tube by an insulator sleeve 322. The connector assemblies and the sleeve may be regarded as a section of the cable, it being apparent that the conductors of the cable are connected to conductors of different connector assemblies of a packer. It will be apparent that each packer must have as many connector assemblies as there are conductors in the cable immediately above and below such packer. Since the openings of the rings are offset, the flow conductor at the location of the packer will be displaced laterally, the flow conductor is of sufficient length and flexibility to permit their lateral displacement thereof.

It will be apparent that while a particular packer has been illustrated and described, other packers having suitable electric conductor means therepast or therethrough may be employed in the well installation.

In use, the packers and the landing nipples 30 are connected in the flow conductor, and constitute sections thereof, and are so spaced that when the flow conductor is in the desired location in the well, a packer is disposed between each pair of adjacent earth formations into which water is to be injected. The cable extends to the surface from the pick-up assemblies and the amplifiers through the cable tubes of the packers. The packers are then expanded to seal between the production flow conductor and the well casing.

If it is then desired to inject water into only some of the earth formations, for example, only the formations A, B and D, the lower end of the flow conductor below the lowermost landing nipple 30d is closed as by a plug, not shown. A shifting tool, such as the one described and illustrated in the patent to Grimmer et al, No. 3,051,243, is then employed to shift the sleeve valves of the landing nipples 30a, 30b and 30d to their open positions, if they have been in their closed positions, and to move the sleeve valve of the landing nipple 31c to its closed position if it has been in its open position.

The flow control assembly 35d which is to be positioned in the lowermost landing nipple 30d is then lowered into the flow conductor, through the usual lubricator tube 221 of the surface well equipment and its associated valves, not shown, for closing its upper end. The lubricator is in vertical alignment with the flow conductor 24 so that the flow control assembly 35d may be easily lowered therethrough into the flow conductor and the landing nipple 30d, by means of a suitable running tool, such as the one illustrated in the patent to Tamplen No. 3,208,531, and anchored in the landing nipple 30d by means of its locating and anchoring device 34. The control assemblies 35b and 35a are then similarly successively located and locked in the landing nipples 30b and 30a, respectively.

The effective orifices of the ports of the orifice mandrels of the three control assemblies are so selected that water may be injected into the earth formations A, B and D at the same or different predetermined rates even though these formations may have different flow resistance, pressure or other characteristics which affect the flow of water thereinto from the flow conductor. Water is then pumped into the flow conduit at the desired rate which is detected by its flow meter 40e and indicated or measured by a suitable meter or recorder R1 of the readout equipment. As the water flows downwardly through the flow conductor a portion thereof will pass through the ports of the orifice mandrel of the control assembly 35a, the ports of the sleeve valve 32a and the ports of the landing nipple 30a into the annulus between the flow conductor and the casing between the casing head and the top packer 27a and thence outwardly into the top earth formation A. The rate of flow of water below the ports of the orifice mandrel of the top control assembly 35a is sensed by its flow meter 40a and indicated by a meter or recorder R2 of the readout equipment. The rate of flow of water above and below the location of the outward flow into the annulus at the nipple 30a now being known, the rate of flow into the formation A can be easily determined. For example, if the flow meter 40e and the readout equipment indicate that water is flowing into the top end of the flow conductor at the rate of 400 barrels a day and the flow meter 40a and the readout equipment indicate that water is flowing past the rotor assembly 37a at the rate of 350 barrels of water per day, it will be apparent that water at the rate of 50 barrels per day is being injected into the earth formation A.

Similarly, the rate of flow of water into the earth formation B is determined by subtracting the amount indicated as flowing through the rotor assembly 38b of the control assembly 35b, for example, 310 barrels per day, from that flowing through the rotor assembly 38a of the top flow control assembly 35a, 350 barrels per day. It will thus be determined that 40 barrels of water per day are flowing into the formation B.

The rate of flow of water into the formation D is similarly determined by subtracting the amount indicated by the meter or recorder R5 as flowing past the rotor assembly 38d from the amount indicated by the recorder R3 as flowing through the rotor assembly 38b.

Figure 5:
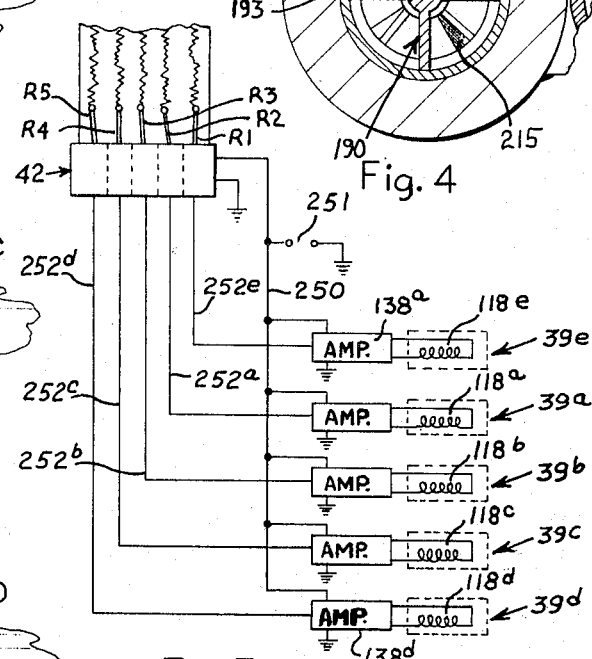
FIGURE 5 is a diagrammatic illustration of the electric circuit of the well installation.

It will thus be apparent that the rates of flow of water into the several formations may be easily determined and, if desired, recorded continuously by the readout equipment if the readout equipment, as illustrated in FIGURE 5, has separate meter and recording means for each flow meter of the well installation. The cable 137 may include a main conductor 250 which is connected to one side of a suitable input circuit 251 of electric current by means of which electric current is supplied to the input circuits of the amplifiers of the flow meters, the other side of the input circuit being connected to the amplifiers through the ground and the flow conductor or through a metal sheath of the cable. The output circuits of the amplifiers of the flow meters pick-up assemblies are transmitted to their individual meter or recorder means R1–R5 of the readout equipment by separate conduits 252a–252e and ground, which may be either the flow conductor itself or a metal sheath of the cable.

It will also be apparent that, if desired, the readout equipment may have only a single meter or recorder means if suitable switch means is provided for selectively connecting the flow meters to such meter.

Any other suitable means may be employed to transmit the outputs of the amplifiers to the readout equipment, as by means of a cable having a single conductor and a metal sheath if the signals produced by the flow meters and their amplifiers are in the form of modulated carrier waves of different frequencies.

If it is desired to stop the flow of water into a particular formation, for example, the formation D, the control assemblies in the landing nipples above the landing nipple 30d, in this particular case, the control assemblies 35a and 35b, as well as the control assembly 35d, are successively removed by means of a suitable pulling tool, such as the one illustrated in the patent to Tamplen, No. 3,208,531. A suitable sleeve valve shifting tool, such as that disclosed in the patent to Grimmer et al., No. 3,051,243, is then inserted into the flow conductor and is employed to shift the sleeve valve of the landing nipple 30d to its closed position. The other control assemblies, 35a and 35b, may then again be replaced in their landing nipple.

Alternatively, if the rate of flow into the formation D is to be changed, the effective orifice of the orifice mandrel of the control assembly 35d is changed by the enlargement of its ports or by the insertion thereof of restricting means, or another orifice mandrel having ports of a different desired effective orifice than the original orifice mandrel may be substituted therefore. The control assemblies are then again replaced in the three landing nipples and the injection of the water can again be started.

It will also be apparent that while the well installation has been described as used to inject liquid into one or more earth formations penetrated by a well bore at controlled rates and to measure the individual rates of flow of the liquid into the several formations from the flow conductor, the well installation may also be used to produce well fluids from a plurality of earth formations and to measure the rate of flow of the well fluids from each of such earth formations. For example, assuming that the sleeve valve of the landing nipple 30c is in its closed position, if the flow meters 40d and 40b indicate that 360 barrels and 400 barrels, of well fluids, respectively, are flowing upwardly through the flow conductor therepast, it would be apparent that the formation D is producing fluids at the rate of 40 barrels per day. Similarly, if the flow meter 40a indicates that 475 barrels of fluid were flowing upwardly therepast per day and the flow meter 40e indicates that 500 barrels of liquid were flowing therepast per day, it would be easily determined that the fluids were being produced at the rate of 75 barrels per day from the formation B and at the rate of 25 barrels from the formation A.

It will thus be apparent that a well installation may be employed either to inject fluids into earth formations at known rates or to produce fluids therefrom at known and desired rates since the effective orifice of the ports of the orifice mandrels may differ.

It will be apparent that while the flow control assembly has been shown as provided with a particular locating and anchoring device, that any other suitable locating and anchoring device which permits the flow control assembly to be located and anchored in a desired landing nipple may be employed to anchor the orifice mandrel and the rotor assembly in predetermined positions relative to the ports of a landing nipple.

It will further be seen that the mandrel of the landing and of the locating and anchoring device, the orifice mandrel and the rotor housing constitute a tubular body having ports which are in communication with the ports of a landing nipple when the control assembly is locked in the landing nipple, that such tubular body is provided with seal means which seal between the tubular body and the landing nipple above and below the ports of the tubular body and of the landing nipple so that all fluids flowing between the flow conductor and the well casing must flow through the ports of the tubular body, and that since the effective orifice of the ports of the tubular body is predetermined, the rate of flow of fluids between the flow conductor and the annulus through the ports of the landing nipple is controlled by the control assembly.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A well installation for providing flow communication between the surface and a plurality of earth formations penetrated by a well bore, said installation including: a flow conductor extending into the well bore, said flow conductor having a plurality of longitudinally spaced landing nipples connected therein and constituting sections thereof; packer means mounted on said flow conductor between adjacent landing nipples to close the well bore about the flow conductor between earth formations with which flow communication is desired, said landing nipples having pick-up means mounted thereon, said landing nipples having ports for establishing communication between an adjacent earth formation and the interior of the flow conductor; and a control assembly landed in and having means releasably latching said assembly to at least one of said landing nipples through whose ports communication between a predetermined adjacent earth formation and the flow conductor is desired, said control assembly being removable through said flow conductor and including rotor means rotatable in response to fluid flowing therepast, said rotor means being operatively associated with the pick-up means of the landing nipple in which the control assembly is landed for causing said pick-up means to provide signals which vary in accordance with the rate of rotation of said rotor means.

2. The well installation of claim 1, wherein said control assembly includes means providing a restricted orifice for controlling flow of fluid through port means of the landing nipple in which the control assembly is disposed.

3. The well installation of claim 2, and seal means for sealing between said control assembly and said nipple above and below said port means and said orifice.

4. The well installation of claim 3, and valve means mounted in said landing nipples for closing said port means.

5. The well installation of claim 4, wherein said landing nipples and said control assembly have cooperable means for removably anchoring said control assembly in the landing nipples.

6. The well installation of claim 5, wherein said rotor means is disposed to indicate the rate of flow of fluid below the port means of a landing nipple when the well installation is used to inject fluids into an earth formation and above the ports of a landing nipple to indicate the rate of flow of well fluids from an earth formation when the well installation is used to produce fluids from earth formations.

7. A control assembly installable in a flow conductor having a lateral port and a detector means for detecting the rate of rotation of a rotor, said control assembly including: a tubular body; anchoring means carried by said body for securing said assembly in said flow conductor; a rotor rotatable in response to flow of fluid therepast, said rotor being mounted on said body such that it will be positioned in opposite relation to said detector means of said flow conductor when said assembly is secured in said flow conductor by said anchoring means; seal means on said body for sealing between said body and flow conductor above and below the lateral port of the flow conductor, said body having port means of predetermined orifice between said seal means.

8. The assembly of claim 7, wherein said tubular body includes opposite end sections and a middle section releasably secured to one another, said rotor being disposed in one of said end sections and said anchoring means being carried by the other of said end sections, said middle section having said port.

9. The assembly of claim 8, and a pair of spaced rotor mount means in said one of said end sections, said rotor being rotatably supported by and between said mount means.

10. The assembly of claim 9, wherein said one of said end sections has a portion of non-magnetic substance adjacent said rotor, said rotor being of magnetic substance.

11. A well installation for providing communication between the surface and a plurality of earth formations penetrated by a well bore, said installation including: a flow conductor extending into said well bore; barrier means closing the well bore about the flow conductor between adjacent earth formations with which flow communication is desired, said flow conductor having longitudinal spaced openable and closable lateral port means, one adjacent each earth formation, for establishing controlled flow communication between such earth formation and the interior of the flow conductor; a plurality of rotor means carried by said flow conductor at said lateral port means for measuring the rate of flow of fluids through each open lateral port means in either direction between the adjacent earth formation and the interior of the flow conductor, said rotor means being in the flow conductor and being rotatable by fluids flowing in the flow conductor; and pickup means mounted on said flow conductor and operatively associated with said rotor means for providing electric signals which vary in accordance with the speed of rotation of said rotor means, said rotor means and said flow conductor having cooperative means for removably securing said rotor means in selected predetermined position with respect to said lateral port means in said flow conductor.

12. A well installation for providing communication between the surface and a plurality of earth formations penetrated by a well bore, said installation including: a flow conductor extending into said well bore; barrier means closing the well bore about the flow conductor between adjacent earth formations with which flow communication is desired, said flow conductor having longitudinal spaced openable and closable lateral port means, one adjacent each earth formation, for establishing controlled flow communication between such earth formation and the interior of the flow conductor; a plurality of rotor means carried by said flow conductor at said lateral port means for measuring the rate of flow of fluids through each open lateral port means in either direction between the adjacent earth formation and the interior of the flow conductor, said rotor means being in the flow conductor and being rotatable by fluids flowing in the flow conductor; and pickup means mounted on said flow conductor and operatively associated with said rotor means for providing electric signals which vary in accordance with the speed of rotation of said rotor means, said rotor means and said flow conductor having cooperative means for removably securing said rotor means in selected predetermined position adjacent said pick-up means on said flow conductor.

References Cited

UNITED STATES PATENTS

| | | | |
|---|---|---|---|
| 1,406,682 | 2/1922 | Rathbone | 73—195 X |
| 2,379,138 | 6/1945 | Fitting et al. | 166—66 X |
| 2,537,066 | 1/1951 | Lewis | 166—115 |
| 2,688,872 | 9/1954 | Hartline et al. | 73—155 |
| 2,786,351 | 3/1957 | Wiley et al. | 73—155 |
| 3,164,020 | 1/1965 | Groner et al. | 73—231 |
| 3,224,267 | 12/1965 | Harlan et al. | 73—155 |
| 3,319,717 | 5/1967 | Chenoweth | 166—115 |

CHARLES O'CONNELL, Primary Examiner.

I. A. CALVERT, Assistant Examiner.

U.S. Cl. X.R.

73—155, 195, 231; 166—10, 115, 191